United States Patent
Kitani et al.

(10) Patent No.: US 7,300,322 B2
(45) Date of Patent: Nov. 27, 2007

(54) OUTBOARD MOTOR

(75) Inventors: Hiroyuki Kitani, Saitama (JP);
 Kazumi Miyashita, Saitama (JP);
 Shigeo Terada, Saitama (JP); Tadafumi Hirose, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 11/188,144

(22) Filed: Jul. 22, 2005

(65) Prior Publication Data

US 2006/0025025 A1 Feb. 2, 2006

(30) Foreign Application Priority Data

| Jul. 28, 2004 | (JP) | ............................. 2004-220735 |
| Jul. 28, 2004 | (JP) | ............................. 2004-220736 |
| Jul. 28, 2004 | (JP) | ............................. 2004-220737 |
| Jul. 28, 2004 | (JP) | ............................. 2004-220738 |
| Jul. 28, 2004 | (JP) | ............................. 2004-220739 |

(51) Int. Cl.
 *B60L 11/00* (2006.01)
 *B63H 21/20* (2006.01)
(52) U.S. Cl. ............................................. 440/6; 440/3
(58) Field of Classification Search .................. 440/3, 440/6
 See application file for complete search history.

(56) References Cited

U.S. PATENT DOCUMENTS

| 3,230,698 | A | * | 1/1966 | Nettles ........................ 60/718 |
| 3,310,021 | A | | 3/1967 | Shimanckas | |
| 3,998,177 | A | * | 12/1976 | Rhodes ........................ 440/40 |
| 4,281,996 | A | | 8/1981 | Mouraret | |
| 4,459,117 | A | | 7/1984 | Jordan | |
| 5,769,674 | A | * | 6/1998 | Stallman ....................... 440/38 |

FOREIGN PATENT DOCUMENTS

| JP | 59-230894 | 12/1984 |
| JP | 61-205899 | 12/1986 |
| JP | 63-158493 | 10/1988 |
| JP | 2001-233290 | 8/2001 |

* cited by examiner

*Primary Examiner*—Jesús D Sotelo
(74) *Attorney, Agent, or Firm*—Carrier, Blackman & Associates, P.C.; Joseph P. Carrier; William D. Blackman

(57) ABSTRACT

An outboard motor is equipped with a centrifugal clutch located between the crankshaft of an engine and a rotor of an electric motor for, when the engine operates, transmitting its output to through the rotor to a propeller, and with a motor output transmission mechanism for, when the engine does not operate, transmitting the output of the motor to the crankshaft. The engine can therefore be started by the motor used to drive the propeller. As a result, there is no need to install a separate electric motor for engine starting, so that starting of the engine by electric power can be made possible with minimum increase in the size and cost of the outboard motor.

31 Claims, 14 Drawing Sheets

OUTBOARD MOTOR

BACKGROUND OF THE INVENTION

1. Field of the Invention

This invention relates to an outboard motor mounted on the stern of a boat and having a propeller to propel the boat.

2. Description of the Related Art

Among of the outboard motors, hybrid outboard motors equipped with an internal combustion engine and an electric motor as propeller drive sources or propulsion unit have been developed.

In the hybrid outboard motors, for selectively transmitting either the output of an internal combustion engine or the output of an electric motor to a propeller, it is conceivable, as taught for example by Japanese Laid-Open Utility Model Application No. Sho 63(1988)-158,493 (e.g., FIG. 5), to connect one end of the output shaft of the electric motor to the output shaft of the internal combustion engine through a centrifugal clutch and connect the other end of the output shaft of the electric motor to the propeller. By this arrangement, during operation of the internal combustion engine, the engine output can be transmitted to the propeller through the centrifugal clutch and the output shaft of the electric motor, whereby the propeller can be driven either by the internal combustion engine alone or by both the internal combustion engine and the electric motor. On the other hand, when the internal combustion engine is not operating, the connection between the internal combustion engine and the electric motor is disengaged to enable driving of the propeller solely by the electric motor.

Although not related to hybrid outboard motors, Japanese Laid-Open Utility Model Application No. Sho 61(1986)-205,899 (FIGS. 1 and 2) and Japanese Utility Model Registration No. 2,549,003 (e.g., FIG. 1) teach methods for cooling an electric motor used to drive a propeller.

The second reference ('899) teaches a configuration in which a chamber accommodating an electric motor is equipped with a pipe communicating with the outside air and the air in the chamber accommodating the electric motor is ventilated through the pipe. The third reference ('003) teaches a configuration in which a radiator is provided in communication with a chamber accommodating an electric motor and the electric motor is cooled by circulating air between the chamber and the radiator.

Another electric outboard motor that uses an electric motor to drive the propeller has been proposed, for example, by Japanese Patent No. 2603841 (page 2, left column, line 33 to page 3, left column, line 16). In the proposed technique, the outboard motor has an attached bar handle such that the operator can rotate around its longitudinal axis to regulate the speed of the electric motor.

Aside from the above, in an outboard motor, the rotational output of an internal combustion engine or the like is ordinarily transmitted to a drive shaft oriented parallel to the vertical direction and the rotation of the drive shaft (rotation around its vertical axis) is transmitted to a propeller shaft after being converted to rotation around a horizontal axis by a bevel gear, as disclosed, for example, in U.S. Pat. No. 3,310,021.

Further, the conventional practice has been to mount an outboard motor on a boat by clamping a screw-type clamping device on the boat transom, as taught, for example, in Japanese Laid-Open Patent Application No. 2001-233,290 (e.g., FIG. 4).

When the burden on the operator is taken into consideration, the internal combustion engine should preferably be started using electric power. In the first prior art taught by '493, however, the electric motor cannot be used to start the internal combustion engine because the connection between the internal combustion engine and the electric motor is cut off when the internal combustion engine is not operating. The outboard motor therefore has to be provided with an additional electric motor for engine starting separately of the electric motor for driving the propeller. This is disadvantageous because it increases the size and cost of the outboard motor.

SUMMARY OF THE INVENTION

A first object of this invention is therefore to overcome this problem by providing a hybrid outboard motor that enables engine starting by electric power while minimizing increase in size and cost.

Aside from the above, in a hybrid outboard motor, not only the electric motor but also the internal combustion engine and the centrifugal clutch should preferably be cooled efficiently.

A second object of this invention is therefore to respond to this issue by providing a hybrid outboard motor that enables efficient cooling of the internal combustion engine and electric motor, as well as the centrifugal clutch installed between them.

Further, the hybrid outboard motor requires regulation of the speeds of both the electric motor and the internal combustion engine. When the fourth prior art taught by '841 is applied to the hybrid outboard motor such as taught by the first prior art '493, the mechanism for regulating the speed of the internal combustion engine needs to be provided separately of the bar handle, which entails the disadvantages of degraded operability and larger outboard motor size.

A third object of this invention is therefore to overcome these disadvantages by providing a hybrid outboard motor that enables regulation of electric motor speed and internal combustion engine speed without degrading operability or increasing outboard motor size.

Aside from the above, conventional outboard motors produce undesirable gear noise owing to the fact that transmission of drive shaft rotation to the propeller shaft is achieved by using a bevel gear to convert rotation around a vertical axis to rotation around a horizontal axis. It is particularly desirable to improve quietness by lowering gear noise in the case of an electrically powered or hybrid outboard motor capable of cruising under the power of a low-noise electric motor.

A fourth object of this invention is therefore to offer a solution to this issue by providing an outboard motor improved in quietness by reducing the number of gears in the power transmission system between the drive sources and the propeller.

Aside from the above, an arrangement that mounts an outboard motor to a boat using a screw-type clamp device like that taught by the sixth reference '290 requires a screw to be turned numerous times on a boat that tends to be wobbly and is therefore inconvenient from the aspect of working ease.

A fifth object of this invention is therefore to solve this problem by providing an outboard motor that is easy to mount on a boat.

In order to achieve the first object, this invention provides in a first aspect an outboard motor adapted to be mounted on a stern of a boat and having a propeller to propel the boat, comprising: an internal combustion engine having an engine output shaft and powering the propeller through the engine output shaft; an electric motor having a motor output shaft and powering the propeller through the motor output shaft; a clutch disposed between the engine and the motor and transmitting an output of the engine to the propeller through the engine output shaft and the motor output shaft, when the engine is operated; and a motor output transmission mechanism transmitting an output of the motor to the engine through the motor output shaft and the engine output shaft, when the engine is to be started.

In order to achieve the second object, this invention provides in a second aspect an outboard motor adapted to be mounted on a stern of a boat and having a propeller to propel the boat, comprising: an internal combustion engine having an engine output shaft and powering the propeller through the engine output shaft; an electric motor having a motor output shaft and powering the propeller through the motor output shaft; a clutch disposed between the engine and the motor and transmitting an output of the engine to the propeller through the engine output shaft and the motor output shaft, when the engine is operated; and an air blower provided between the motor and the clutch and blowing air to cool at least the motor.

In order to achieve the third object, this invention provides in a third aspect an outboard motor adapted to be mounted on a stern of a boat and having a propeller to propel the boat, comprising: an internal combustion engine having an engine output shaft and powering the propeller through the engine output shaft; an electric motor having a motor output shaft and powering the propeller through the motor output shaft, when the engine is not operated; a bar handle installed to be operable by an operator; a throttle grip provided at the bar handle to be rotatable by the operator and having a throttle opening regulator that regulates an opening of a throttle valve of the engine in response to the rotation of the throttle grip; a rotation angle sensor installed in the throttle grip and outputting a signal indicative of a rotation angle of the throttle grip; and a controller installed inside the throttle grip and inputting the outputted signal of the rotation angle sensor to control operation of the motor in response to the outputted signal of the sensor.

In order to achieve the fourth object, this invention provides in a fourth aspect an outboard motor adapted to be mounted on a stern of a boat, comprising: a drive shaft oriented in a direction parallel with a vertical axis when mounted on the stern of the boat; a motor connected to an upper end of the drive shaft and rotating the drive shaft about the vertical axis; a propeller connected to a lower end of the drive shaft to be rotatable about the vertical axis; and a cover having a tube-like shape and enclosing the propeller inside the tube.

In order to achieve the fifth object, this invention provides in a fifth aspect in an outboard motor adapted to be mounted on a transom of a boat by a mounting device, the mounting device comprising: a stern bracket having a transom abutment member for abutment on a rear face of the transom and a slide beam projecting forward of the transom; a slide bracket attached to the slide beam to be slidable in a thickness direction of the transom; a clamp member supported by the slide bracket to be slidable in the thickness direction of the transom; a manual lever supported to be swingable about a rotation axis formed on the slide bracket by an operator; and a link interconnecting the clamp member and the manual lever to transmit displacement of the manual lever to the clamp member; whereby the transom is clamped between the transom abutment member of the stern bracket and the clamp member to be mounted thereon by allowing the operator to operate the manual lever to slide the clamp member to a position where the clamp member abuts on a front face of the transom.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an outboard motor according to the present invention will now be explained with reference to the attached drawings.

Figure 1:
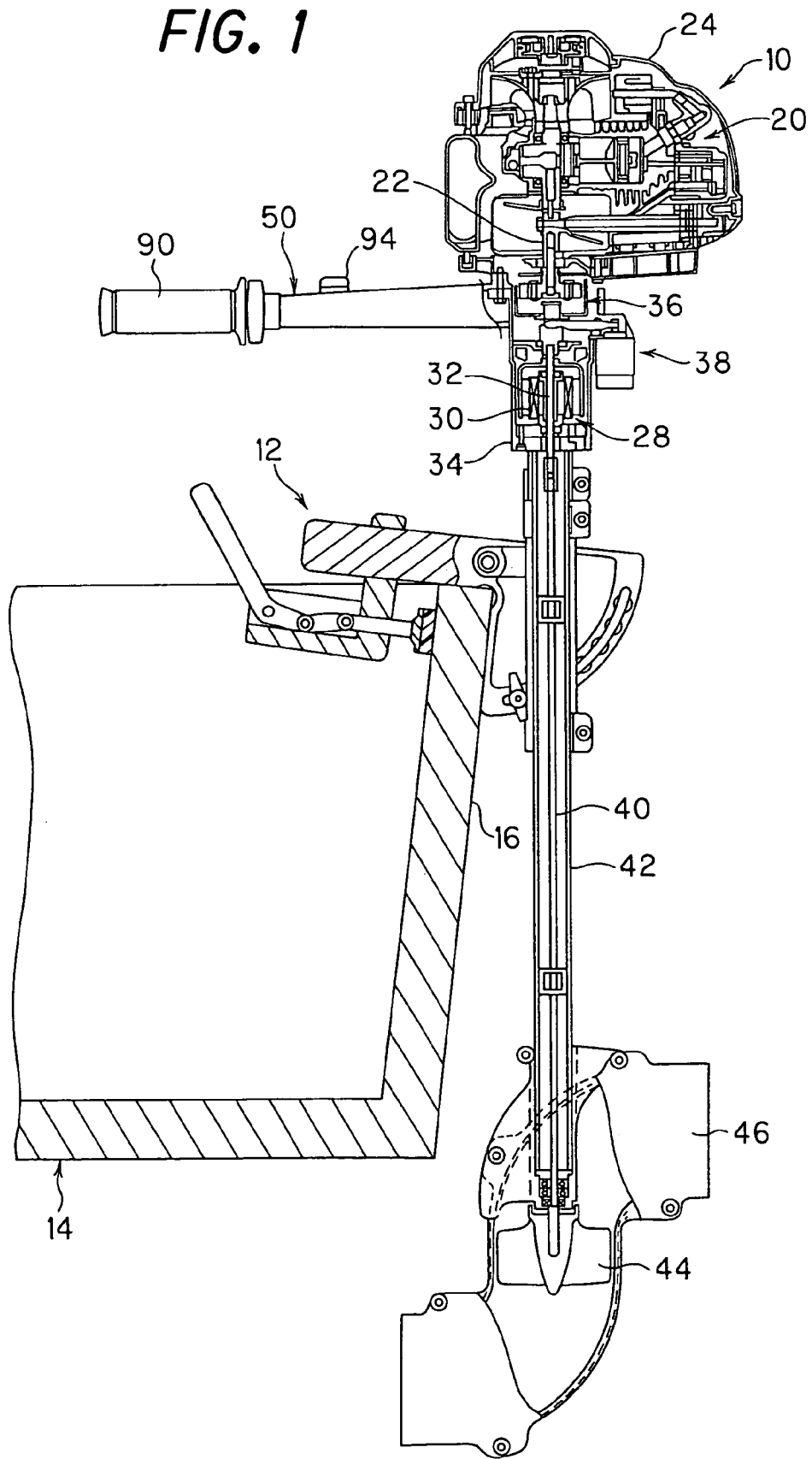
FIG. 1 is a partially sectional view of an outboard motor according to an embodiment of the invention.

FIG. 1 is a partially sectional view of an outboard motor according to an embodiment of the invention.

Symbol 10 in FIG. 1 designates an outboard motor. The outboard motor 10 is mounted on the stern, more specifically on the transom 16 of a boat 14 by means of a mounting device 12.

The outboard motor 10 is equipped with an internal combustion engine (motor; hereinafter simply referred to as "engine") 20 at its upper portion. The engine 20 is a one-cylinder gasoline engine with a displacement of about 50 cc capable of producing an output of 1.5 KW (about 2 PS). As shown in the drawing, the engine 20 has its crankshaft (output shaft) 22 aligned vertically and enclosed or covered by an engine cover 24.

An electric motor (motor) 28 is installed in the outboard motor 10 vertically downward of the engine 20. The electric motor 28 is a DC brushless motor comprising a stator 30 and a rotor (output shaft) 32 that produces an output of several hundred Watts. As illustrated, the electric motor 28 has its rotor 32 vertically aligned and enclosed or covered by a motor cover 34.

A centrifugal clutch 36 is installed between the engine 20 and electric motor 28. Specifically, the lower end of the crankshaft 22 of the engine and the upper end of the rotor 32 of the electric motor are connected through the centrifugal clutch 36. A motor output transmission mechanism 38 for transmitting the output of the electric motor 28 to the engine 20 when the engine 20 is stopped is installed near the centrifugal clutch 36.

The upper end of a drive shaft 40 is connected to the lower end of the rotor 32 of electric motor 28. As shown in the drawing, the drive shaft 40 is aligned parallel to the vertical direction and is supported within a drive shaft cover 42 to be ratable around its vertical axis.

A propeller 44 is directly attached to the lower end of the drive shaft 40. The propeller 44 is enclosed within a cylindrical propeller cover 46 of S-like shape viewed from the side.

The engine crankshaft 22, centrifugal clutch 36, electric motor rotor 32, drive shaft 40 and propeller 44 all have their centers of rotation on the same axis. Moreover, the power transmission system between the engine 20 and the propeller 44 is totally gearless.

The output (rotational output) of the electric motor 28 is transmitted to the propeller 44 through the drive shaft 40. The output (rotational output) of the engine 20 is transmitted to the rotor 32 of the electric motor 28 through the centrifugal clutch 36 and then to the propeller 44 through the drive shaft 40. In other words, the propeller 44 is rotated around its vertical axis by either the output of the engine 20 or the output of the electric motor 28. The outboard motor 10 is thus a hybrid outboard motor equipped with the engine 20 and the electric motor 28 as propeller 44 drive or power sources. More specifically, it is a small outboard motor equipped with the engine 20 of approximately 50 cc displacement and the electric motor 28 capable of producing an output of several hundred Watts.

The outboard motor 10 is equipped with a bar handle 50 installed below the engine cover 24. As illustrated, the bar handle 50 projects in the forward direction of the boat 14 (forward in the direction of boat travel) to be operable by the operator. The drive shaft cover 42 is supported by the mounting device 12 to be rotatable around its vertical axis, so that the operator can steer the outboard motor 10 left and right by swinging the bar handle 50 left and right.

The parts of the outboard motor 10 will now be explained in detail with reference to FIG. 2 and ensuing figures.

Figure 2:
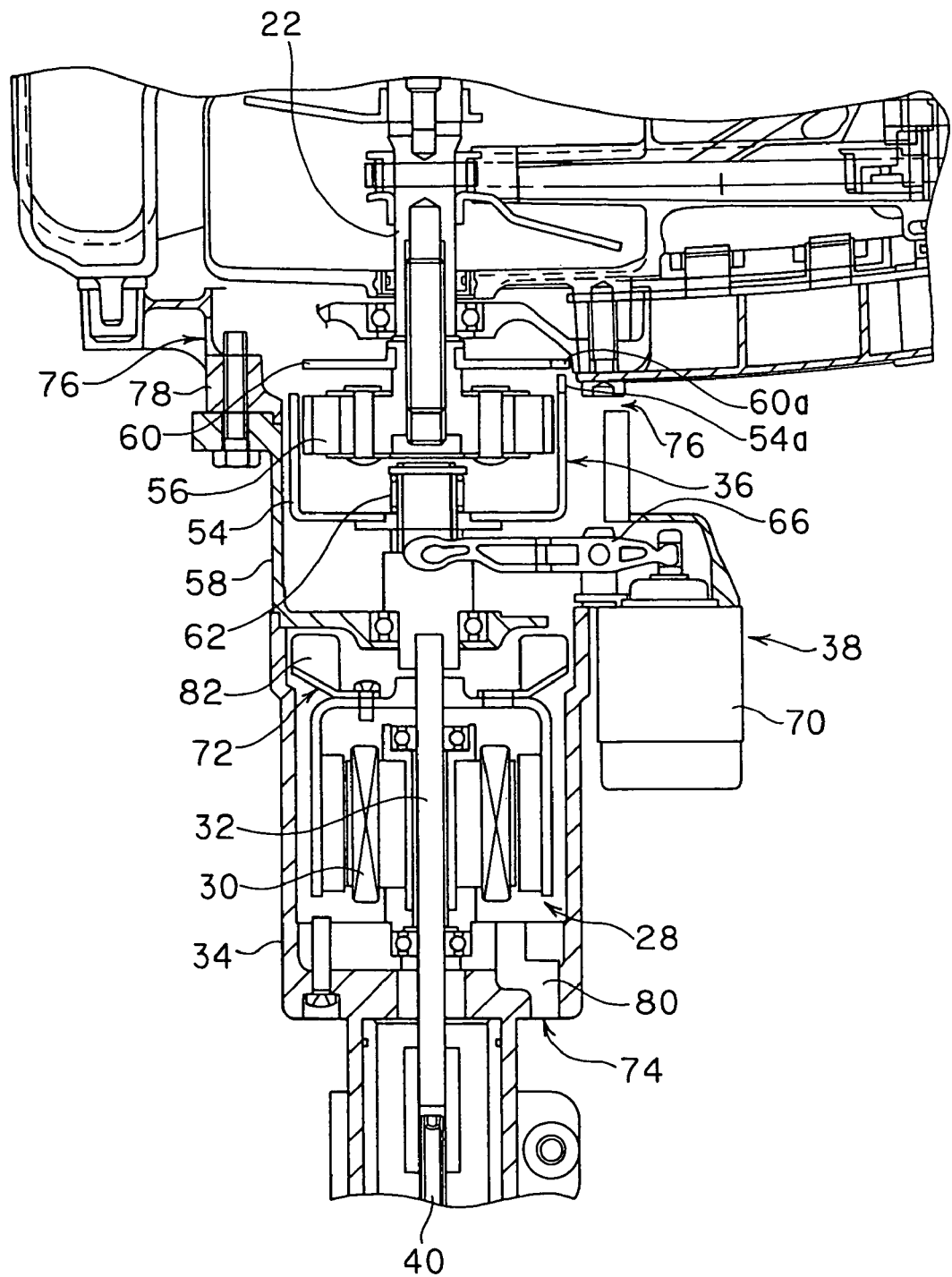
FIG. 2 is an enlarged sectional view of FIG. 1 taken in the vicinity of a centrifugal clutch shown in FIG. 1.

FIG. 2 is an enlarged sectional view of FIG. 1 taken in the vicinity of the centrifugal clutch 36.

As shown in FIG. 2, the centrifugal clutch 36 comprises a clutch outer 54 attached to the rotor 32 of the electric motor 28 and a clutch shoe 56 fastened to the crankshaft 22. The clutch outer 54 and clutch shoe 56 are enclosed by a clutch cover 58.

The clutch outer 54 is positioned to envelop the clutch shoe 56. The clutch shoe 56 is equipped with a spring not visible in the drawing. When the engine 20 operates (more exactly, when it operates at a speed exceeding the idle speed), the spring is elongated by centrifugal force and the clutch shoe 56 is pressed onto the inner wall of the clutch outer 54. In this condition, the output of the engine 20 is transmitted to the rotor 32 of the electric motor.

A drive plate 60 is fastened to the crankshaft 22 at a position above the clutch shoe 56. The drive plate 60 is circular in plan view and is formed at its circumference with at least one protuberance 60a.

The clutch outer 54 is attached to the rotor 32 to be slidable in the axial direction thereof and is pushed or biased in the direction of moving away from the drive plate 60 by a spring 62. At least one protuberance 54a is formed at the upper end of the clutch outer 54.

A lever 66 is installed at a position under the clutch outer 54 to be movably in contact with the clutch outer 54. The lever 66 is pivotally supported at an intermediate pin (pivot) to be capable of swinging up and down inside the clutch cover 58. One end of the lever 66 is formed into a cam and the other end thereof is connected to an electromagnetic solenoid 70 to be driven thereby. The arrangement is such that the lever 66 can be driven by the solenoid 70 to swing its cam-shaped end up and down. Specifically, the cam-shaped end of the lever 66 is driven upward when the solenoid 70 is energized.

Figure 3:
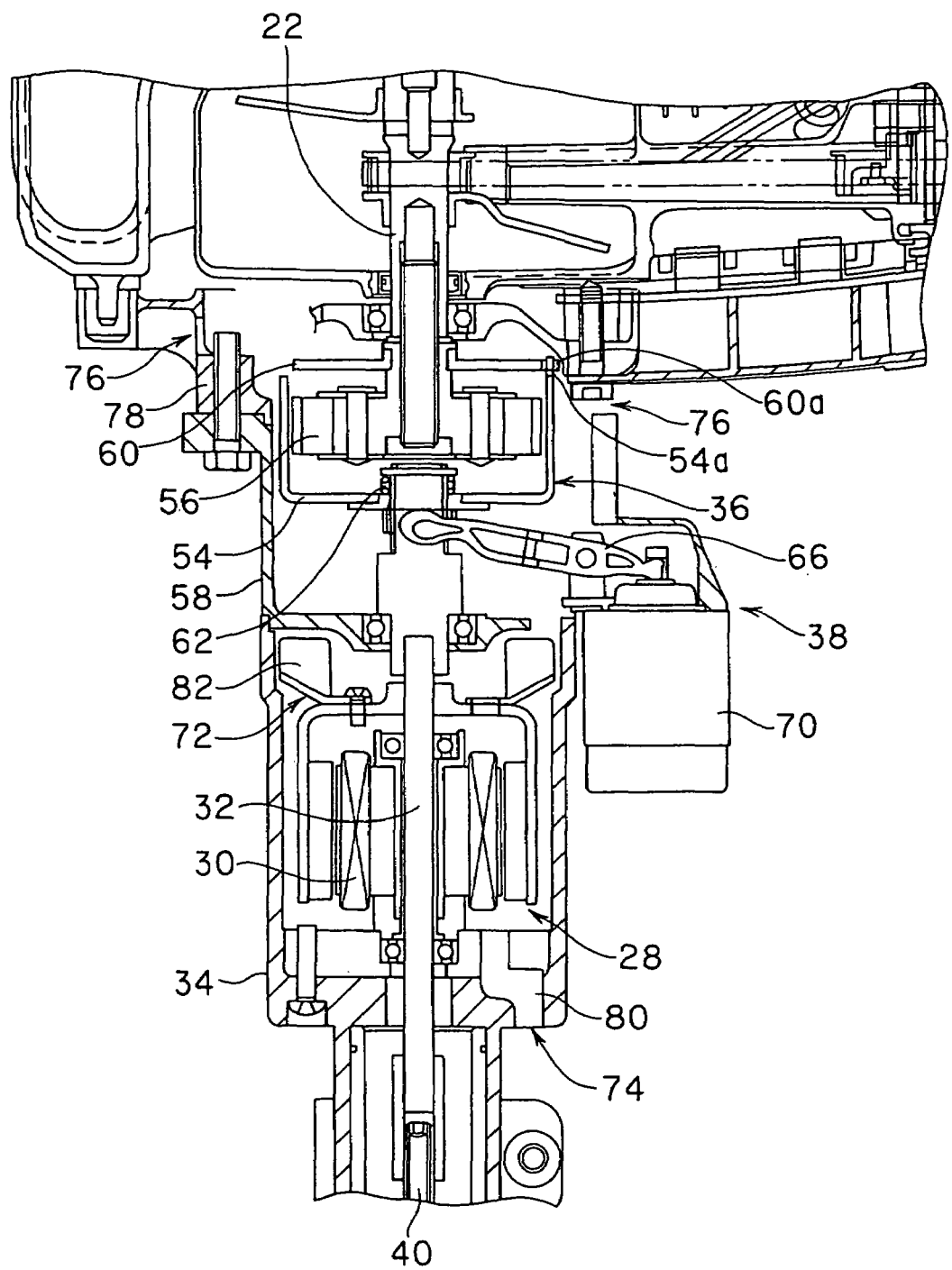
FIG. 3 is an enlarged sectional view similar to FIG. 2, taken in the vicinity of the centrifugal clutch shown in FIG. 1.

Upon energization of the solenoid 70, the clutch outer 54 is pushed upward by the cam-shaped end of the lever 66 as shown in FIG. 3. The clutch outer 54 therefore slides toward the drive plate 60 to bring the protuberance 54a into engagement with the protuberance 60a of the drive plate 60. When the electric motor 28 is operated after this engagement is established, the rotation of the rotor 32 is transmitted to the crankshaft 22 of the engine 20 through the clutch outer 54 and drive plate 60. In other words, the engine 20 is started by the electric motor 28 that serves as a drive source of the propeller 44.

Thus, the motor output transmission mechanism 38 comprises the drive plate 60 fastened to the crankshaft 22, the lever 66 for sliding the clutch outer 54 toward the drive plate 60 to engage the clutch outer 54 with the drive plate 60 (more exactly, the protuberance 54a of the clutch outer 54 with the protuberance 60a of the drive plate 60), and the solenoid 70 for driving the lever 66.

As shown in FIG. 2, an air blower constituted as a centrifugal fan 72 is provided at a region or in the proximity of the rotor 32 between the centrifugal clutch 36 and electric motor 28 (more specifically, the stator 30 thereof).

Symbols 74 and 76 in the drawing respectively designate an inlet and outlets of the centrifugal fan 72. The inlet 74 is situated below and the outlets 76 above the electric motor 28. The inlet 74 comprises at least one opening situated below the lower end of the motor cover 34 in the vertical direction. The outlets 76 comprise at least one horizontally directed opening at each of two locations, namely, at the upper end of the clutch cover 58 and near the lower end of an engine mount 78 bearing the engine 20.

An air passage 80 communicating with the inlet 74 is given a winding configuration, which in this embodiment is crank-like with two right-angle bends.

Figure 4:
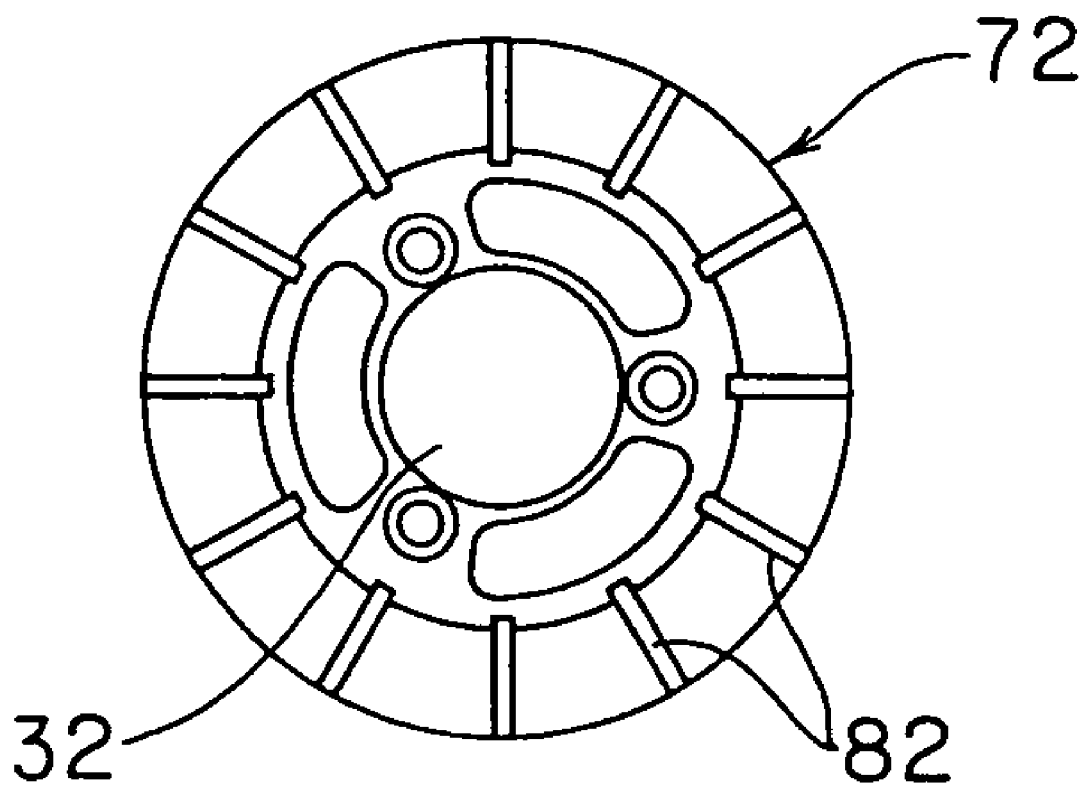
FIG. 4 is a plan view of a centrifugal fan shown in FIG. 2.

FIG. 4 is a plan view of the centrifugal fan 72.

The centrifugal fan 72 is provided with a plurality of fins 82 at its upper surface. The fins 82 are formed to extend along radial extensions from the center of the rotor 32 so as to always blow air from below to above regardless of the direction of rotation of the centrifugal fan 72 (of the rotor 32 constituting the rotating shaft).

Figure 5:
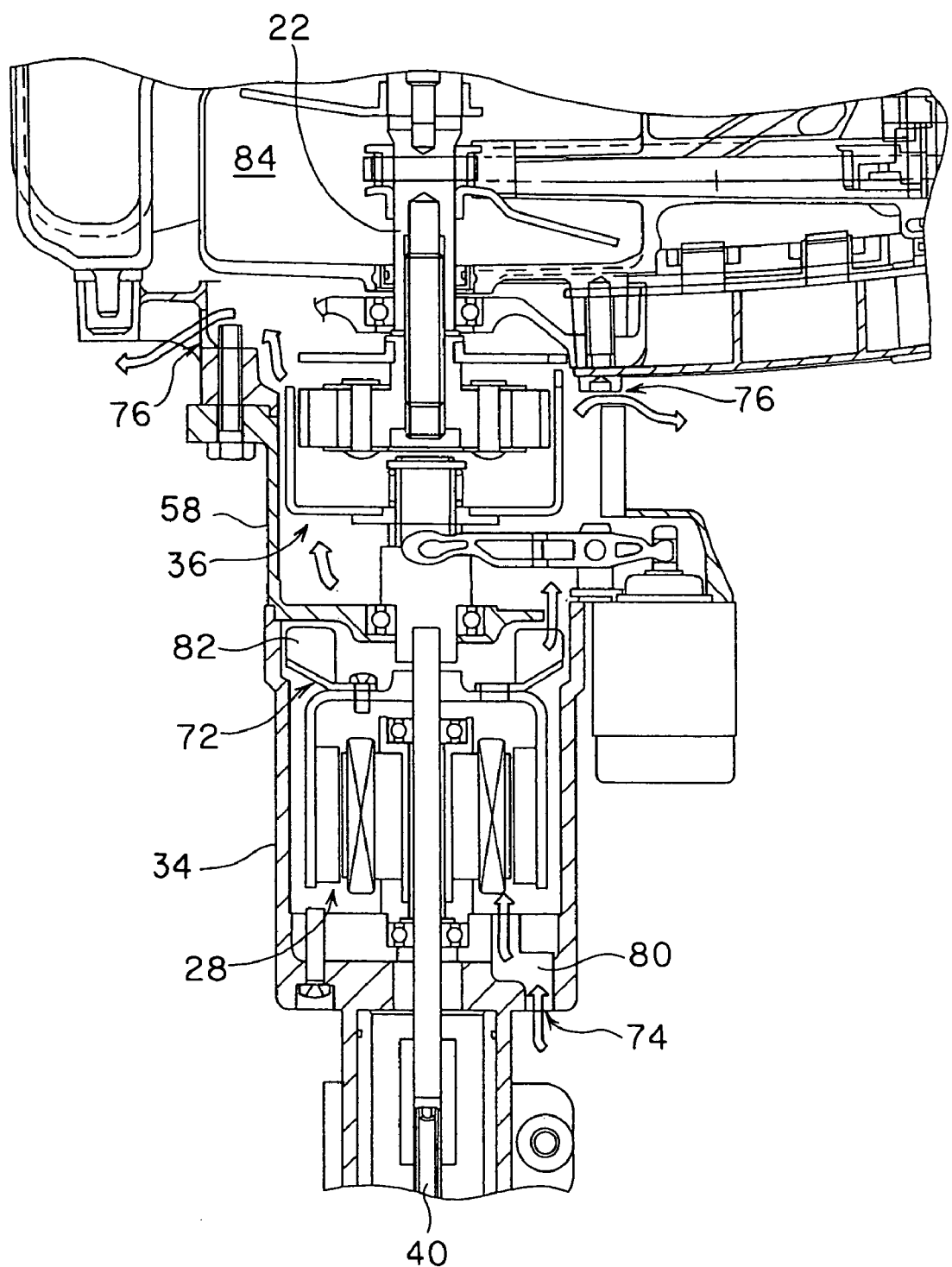
FIG. 5 is an enlarged sectional view similar to FIG. 2, taken in the vicinity of the centrifugal clutch shown in FIG. 1.

The path of the air stream produced by rotating the centrifugal fan 72 will be explained with reference to FIG. 5.

When the centrifugal fan 72 is rotated, air (cooling air) first flows into the motor cover 34 through the inlet 74 and air passage 80. The air flowing into the motor cover 34 passes to the top of the motor cover 34 while cooling the electric motor 28 and then enters the clutch cover 58.

The air flowing into the clutch cover 58 passes to the top of the clutch cover 58 while cooling the centrifugal clutch 36, whereafter it cools the engine 20 (more exactly, an oil pan 84 containing engine lubricating oil) and then exits to the exterior through the outlets 76. Thus the centrifugal fan 72 sucks in air from below and blows upward to cool the electric motor 28, centrifugal clutch 36 and engine 20 in succession.

The propeller cover 46 will now be explained.

Figure 6:
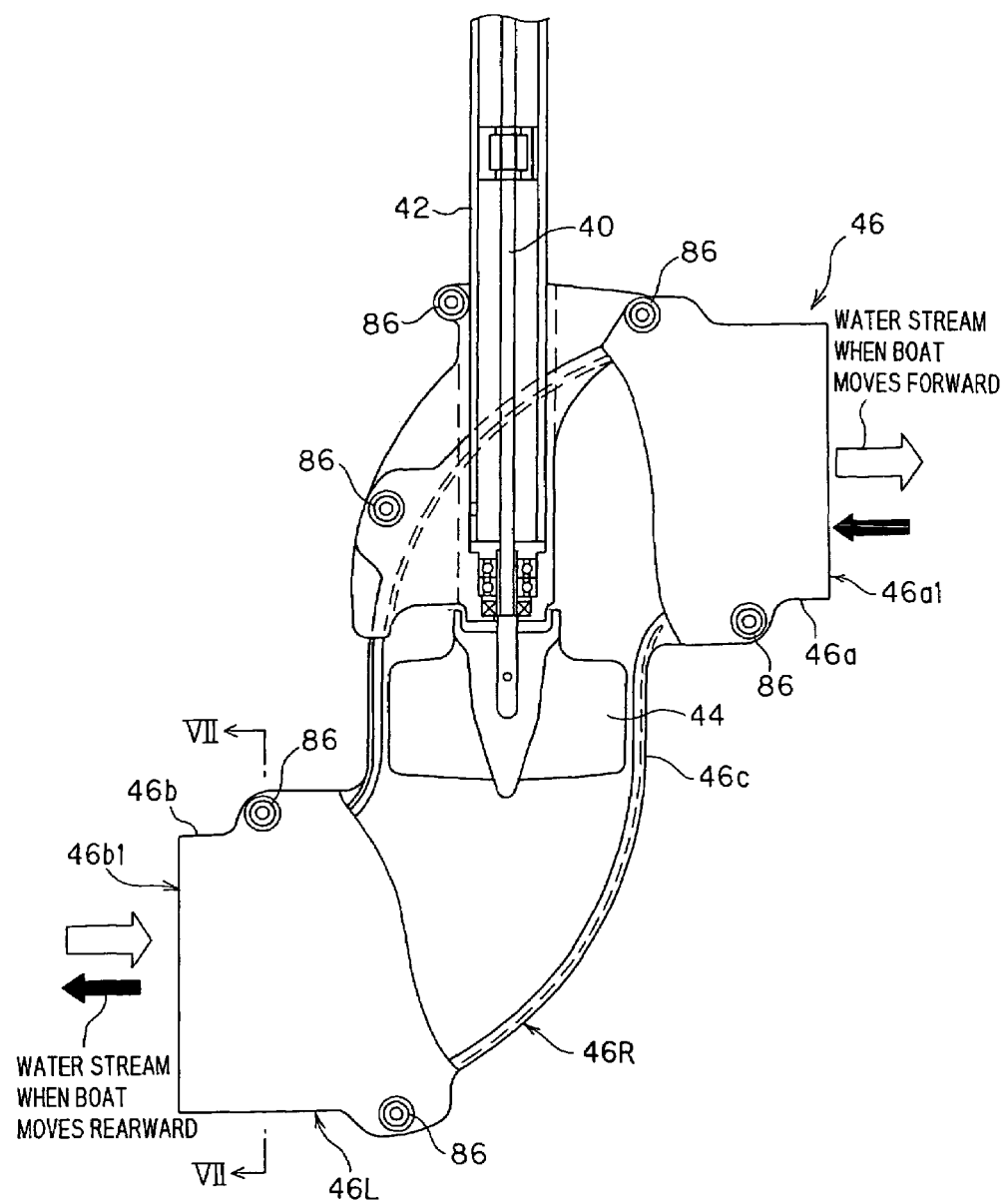
FIG. 6 is an enlarged, partially sectional view taken in the vicinity of a propeller cover shown in FIG. 1.
Figure 7:
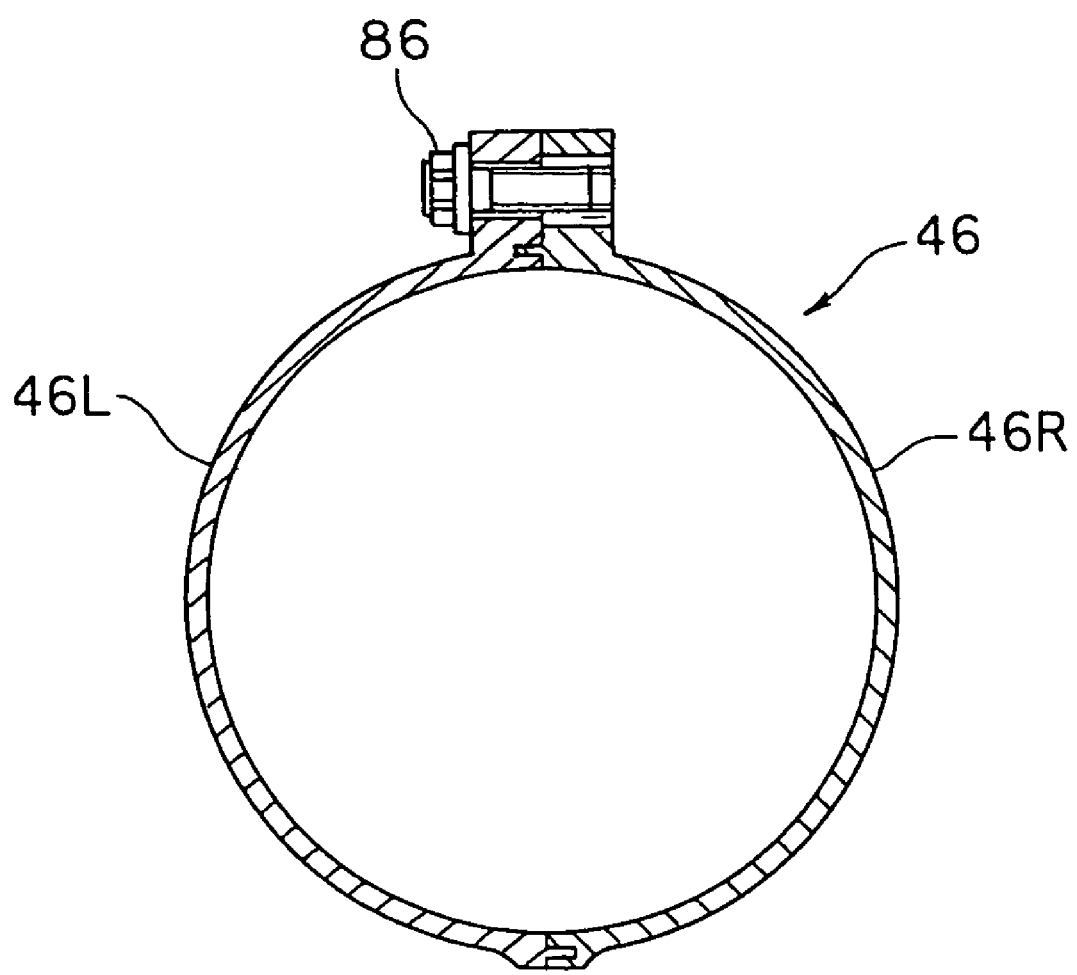
FIG. 7 is a sectional view taken along line VII-VII of FIG. 6.

FIG. 6 is an enlarged, partially sectional view of the propeller cover 46. FIG. 7 is a sectional view taken along line VII-VII of FIG. 6.

As shown in FIGS. 6 and 7, the propeller cover 46 is an assembly of a plurality of members, which in this embodiment are left and right members 46L and 46R formed to be substantially laterally symmetrical. The member 46R on the right side in the direction of forward travel is fastened to the drive shaft cover 42. The member 46L is removably attached to the member 46R by bolts 86. As shown in FIG. 7, the right side member 46R and left side member 46L are assembled with no intervening gap by tongue-in-groove engagement at their contacting faces.

As shown in FIG. 6, the propeller cover 46 has a tube-like shape, more specifically an S-like shape when viewed from the side, as mentioned above. To establish this shape, the propeller cover 46 is formed of a first section 46a that is directed parallel to the horizontal direction and has an opening 46a1 directed rearward, a second section 46b situated lower than the first section 46a that is directed parallel to the horizontal direction and has an opening 46b1 directed forward, and a third section 46c that is directed parallel to the vertical direction to interconnect curved portions of the first section 46a and second section 46b.

The propeller 44 is located inside the third section 46c. The propeller 44 is rotated in the direction for producing water stream directed upward when the boat 14 is to be moved forward and in the direction for producing water stream directed downward when the boat 14 is to be moved rearward. In the following, the rotation when the propeller 44 generates upward water stream is sometimes called "forward" rotation and that when it generates downward water stream is sometimes called "reverse" rotation.

During forward rotation, the propeller 44 sucks water in through the opening 46b1 of the second section 46b and discharges it through the opening 46a1 of the first section 46a. During reverse rotation, the propeller 44 sucks water in through the opening 46a1 of the first section 46a and discharges it through the opening 46b1 of the second section 46b. Thus in either case, the water stream in the vertical direction produced by the rotation of the propeller 44 about the vertical axis is redirected horizontally by the propeller cover 46 to produce thrust for moving the boat 14 forward or rearward.

The bar handle 50 will now be explained.

Figure 8:
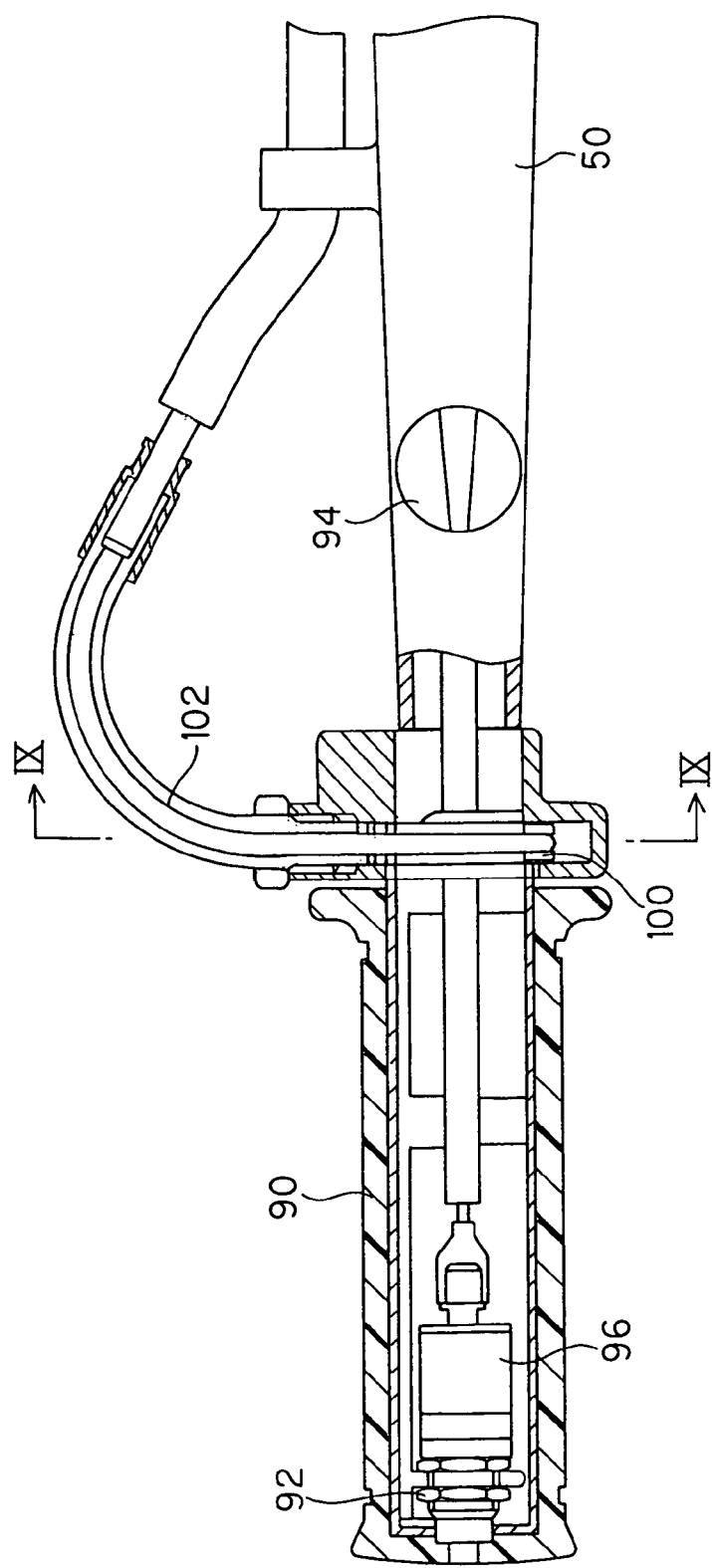
FIG. 8 is an enlarged, partially sectional plan view of a bar handle shown in FIG. 1.

FIG. 8 is an enlarged, partially sectional view of the bar handle 50.

As shown in FIG. 8, the bar handle 50 is provided at its free end with a throttle grip 90 that can be rotated by the operator and that accommodates a rotation angle sensor 92 for outputting or generating a signal indicative of the rotation angle of the throttle grip 90. A manual switch 94 is provided near the throttle grip 90 to be manipulated by the operator. The manual switch 94 outputs or generates signals corresponding to five positions (explained later) selected by the operator. The rotation angle sensor 92 and manual switch 94 are electrically connected to a controller 96 installed inside the throttle grip 90 and the outputs of the rotation angle sensor 92 and manual switch 94 are sent to the controller 96. The controller 96 comprises a microcomputer and controls the operation of the electric motor 28 in response to the angle to which the throttle grip 90 is rotated (i.e., in response to the output of the rotation angle sensor 92).

Figure 9:
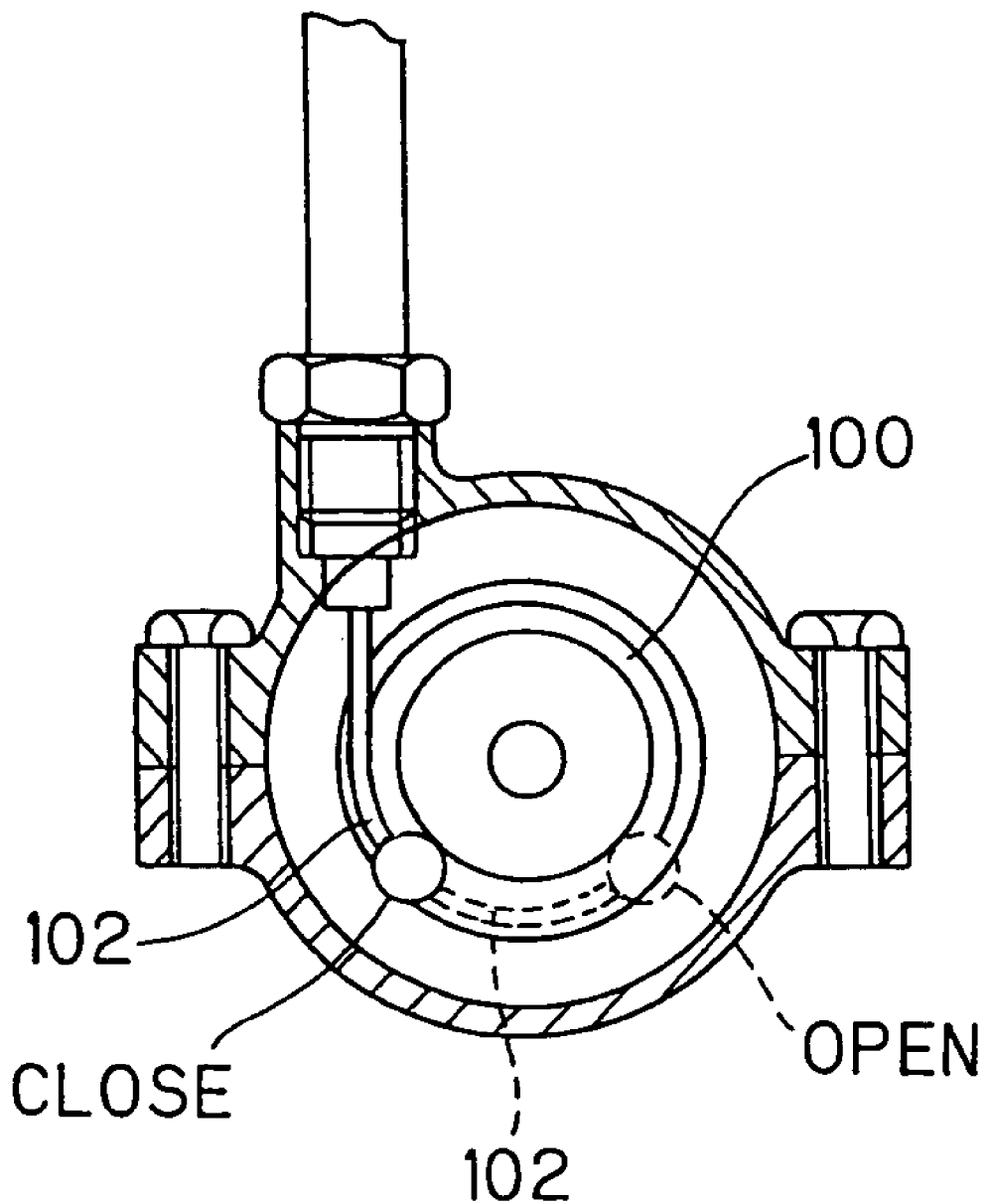
FIG. 9 is a sectional view taken along line IX-IX in FIG. 8.

FIG. 9 is a sectional view taken along line IX-IX in FIG. 8.

As shown in FIGS. 8 and 9, a pulley (throttle opening regulator) 100 is attached to the throttle grip 90 near its inward end. A throttle cable (constituted as a push-pull cable) 102 connected to the throttle valve (not shown) of the engine 20 is wound about the pulley 100. The pulley 100 turns together with the throttle grip 90 (in other words, in response to the rotation of the throttle grip 90) to advance and retract (push and pull) the throttle cable 102. This advance and retraction of the throttle cable 102 opens and closes the throttle valve so as to regulate the intake air flow to the engine 20, thereby regulating the engine speed.

Figure 10:
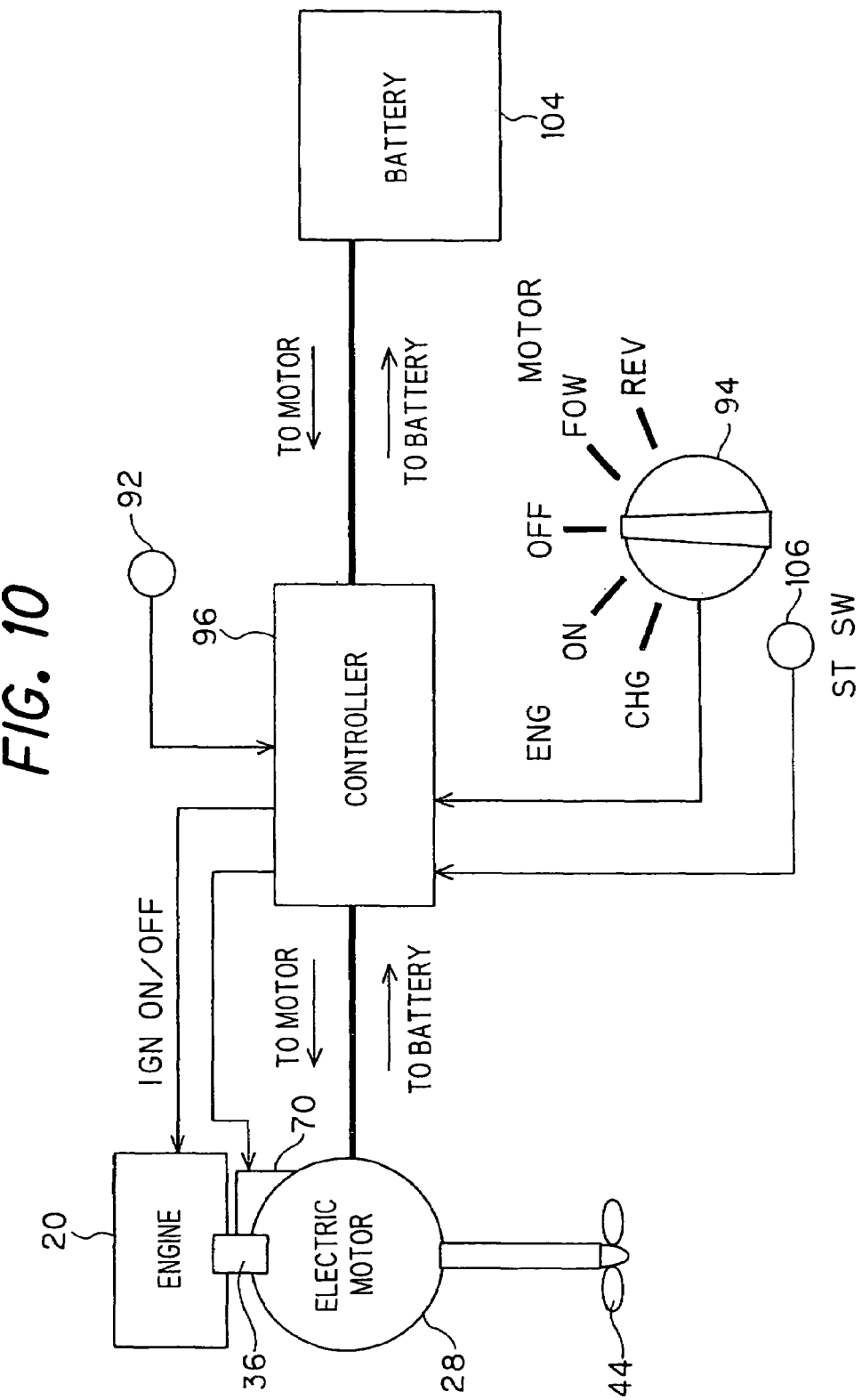
FIG. 10 is a block diagram showing the operation of the outboard motor shown in FIG. 1.

FIG. 10 is a block diagram showing the operation of the outboard motor 10.

As shown in FIG. 10, the manual switch 94 has five positions, CHG (charge), ON, OFF, FOW (forward) and REV (reverse), from among which the operator can select any position as desired. In other words, the manual switch 94 is provided at the bar handle 50 to be operable for the operator to input one from among instructions to start or stop the engine 20, to start or stop the motor 28 and to indicate a direction in which the boat 14.

The controller 96 has connected thereto not only the rotation angle sensor 92 and manual switch 94 but also the engine 20 (more exactly, the ignition device including ignition plug (not shown)), the electric motor 28, the solenoid 70, a battery 104 mounted at an appropriate location in the outboard motor 10, and a starter switch 106. The battery 104 serves as an operating power source for the ignition device of the engine 20, the electric motor 28, the solenoid 70, the controller 96 and auxiliary equipment.

The operation of the outboard motor 10 will now be explained.

When the operator sets the manual switch 94 to FOW (forward), the controller 96 controls the operation of the electric motor 28 to rotate the propeller 44 forward. In the following, the direction of rotation of the electric motor 28 when the propeller 44 is rotated forward will be defined as "forward."

When the operator selects REV (reverse), the controller 96 controls the operation of the electric motor 28 to rotate the propeller 44 in reverse. In the following, the direction of rotation of the electric motor 28 when the propeller 44 is rotated in reverse will be defined as "reverse."

Thus the direction of rotation of the electric motor 28 is opposite between when the manual switch 94 is set to FOW and when it is set to REV. The speed of the electric motor 28 when one or the other of the FOW and REV positions is selected is varied in response to the output of the rotation angle sensor 92 and thus in response to the manipulated variable inputted by the operator through the throttle grip 90.

When the operator selects the ON position, the controller 96 initiates supply of voltage to the ignition device of the engine 20. When the operator then operates the starter switch 106 with the manual switch 94 still at ON, the controller 96 initiates supply of current to the solenoid 70 and, after a predetermined time period has passed following the start of current supply to the solenoid 70, operates the electric motor 28. Specifically, after starting to supply current to the solenoid 70, the controller 96 waits until the operation of the solenoid 70 completes engagement of the protuberance 54a of the clutch outer with the protuberance 60a of the clutch plate and then controls the operation of the electric motor 28 so as to make it rotate forward. As a result, the output of electric motor 28 rotates the crankshaft 22 to start the engine 20.

When the operator rotates the throttle grip 90 to operate the engine 20 at a speed higher than idle speed, the output of the engine 20 is transmitted to the propeller 44 through the centrifugal clutch 36 and so forth. The rotation of the propeller 44 at this time is forward rotation. When the starter switch 106 is not being operated, the electrical connection between the electric motor 28 and battery 104 is cut off to reduce load on the engine 20.

When the operator selects the CHG (charge) position, the controller 96 electrically connects the electric motor 28 and battery 104 while keeping the engine 20 in operation. The rotation of the rotor 32 of the electric motor by the output of the engine 20 therefore enables the electric motor 28 to function as a generator for generating electric energy that charges the battery 104.

When the operator selects the OFF position, the controller 96 cuts off the supply of current to both the ignition device of the engine 20 and the electric motor 28, thereby stopping the operation of the engine 20 and electric motor 28.

As shown in the drawing, the OFF position is located intermediately between the ON position for starting the engine 20 on one side and the FOW and REV positions for operating the electric motor 28 on the other side. This arrangement prevents the engine 20 and electric motor 28 from operating simultaneously. The configuration for enabling speed regulation of the engine 20 and electric motor 28 by a single operating member (the throttle grip 90) therefore does not lead to interference between one operating mode and the other.

Thus, by manipulating the manual switch 94, the operator can operate and stop the engine 20 and electric motor 28, and control the direction of rotation of the electric motor 28. And, by manipulating the throttle grip 90, the operator can regulate the speed of the engine 20 and electric motor 28.

The mounting device 12 will now be explained with reference to FIG. 11.

Figure 11:
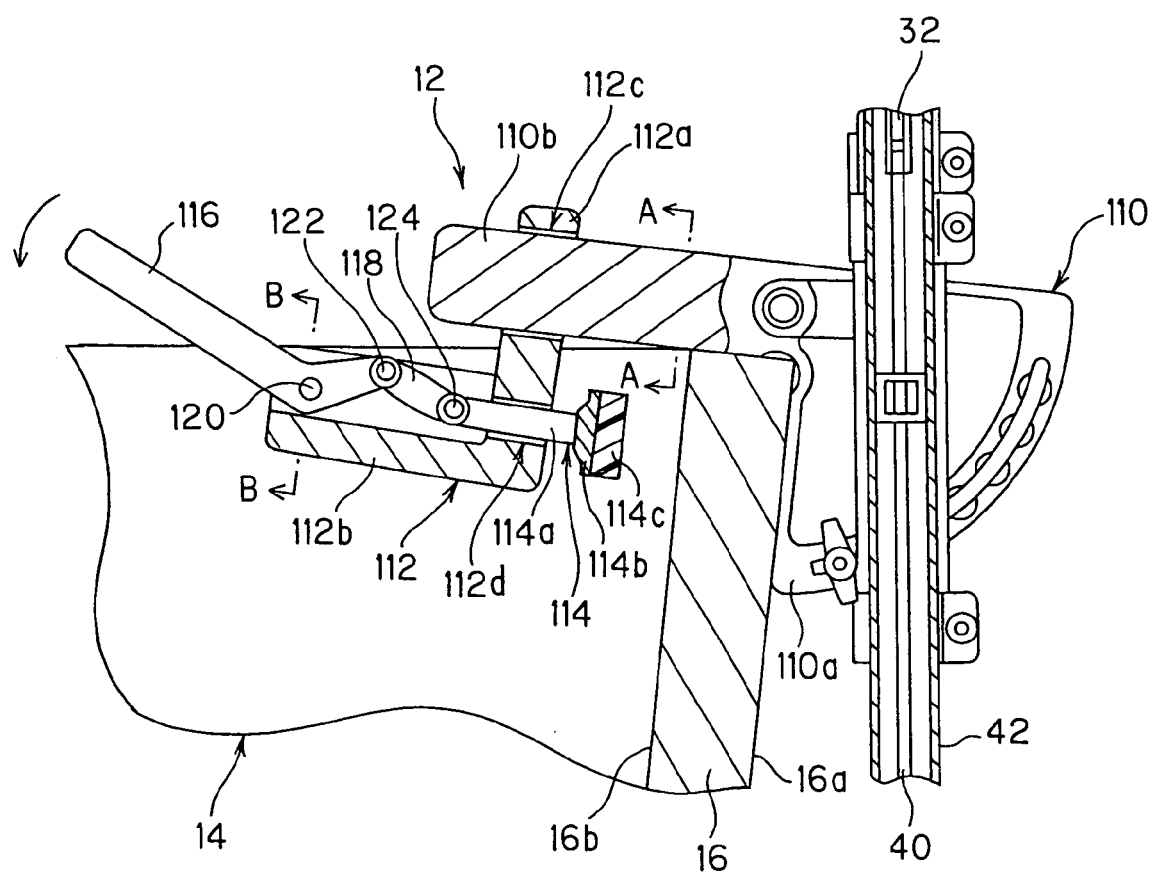
FIG. 11 is an enlarged sectional view of a mounting device shown in FIG. 1.

FIG. 11 is an enlarged sectional view of the mounting device 12.

The mounting device 12 is equipped with two stern brackets 110 that are attached to the left and right sides of the drive shaft cover 42. (Only the stern bracket on the right side is shown in FIG. 11.) Although the following explanation is made with respect to the stern bracket on the right side, it also applies to the unshown stern bracket on the left side because the two brackets are laterally symmetrical.

The stern bracket 110 comprises a transom abutment member 110a that abuts on the rear face 16a of the transom 16 and a slide beam 110b that projects forward from the upper end of the transom 16. A cross-section of the slide beam 110b taken along line A-A in FIG. 11 has a rectangular profile.

The mounting device 12 includes, in addition to the stern brackets 110, a slide bracket 112 slidably attached to the slide beam 110b to extend in the thickness direction of the transom 16 (in the direction of slide beam 110b projection), a clamp member 114 supported by the slide bracket 112 to be slidable in the thickness direction of the transom 16, a manual lever 116 supported to be swingable about a rotation axis formed on the slide bracket 112, and a link 118 interconnecting the clamp member 114 and manual lever 116 for transmitting displacement of the manual lever 116 to the clamp member 114.

A rotation axis 120 of the manual lever 116, a connecting axis 122 connecting the manual lever 116 and the link 118, and a connecting axis 124 connecting the link 118 and the clamp member 114 are all aligned in parallel. That is to say, the rotation axis 120 and the connecting axes 122 and 124 all lie perpendicular to the thickness direction of transom 16.

The slide bracket 112 is formed to have a wall 11 2a extending perpendicular to the projecting direction (longitudinal direction) of the side beam 110b and a link accommodating member 112b extending from the lower end of the wall 112a to go away from the transom 16. A section of the link accommodating member 112b taken at line B-B in FIG. 11 has a concave profile and the whole of the link 118 and parts of the manual lever 116 and clamp member 114 are accommodated in the groove of the concavity.

Figure 12:
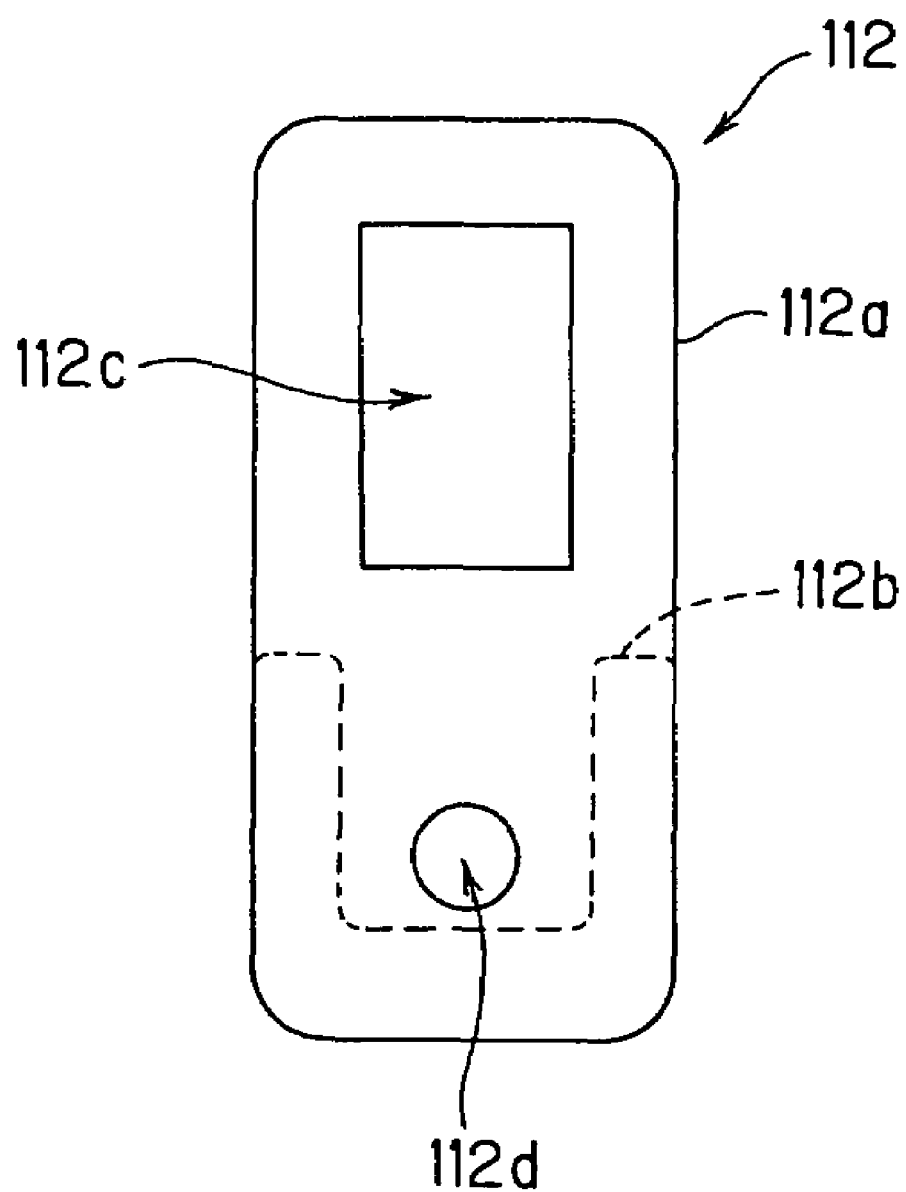
FIG. 12 is an enlarged front view of a slide bracket shown in FIG. 11.

FIG. 12 is an enlarged front view of the slide bracket 112 (view of the wall 112a seen from the side of the transom 16).

The upper part of the slide bracket 112 is formed with a rectangular hole 112c for passage of the slide beam 110b (not shown in FIG. 12) and the lower part with a circular hole 112d for passage of the clamp member 114 (not shown in FIG. 12). The hole 112c and hole 112d are both formed parallel to the thickness direction of the transom 16.

As shown in FIG. 11, the slide beam 110b passes through the hole 112c formed in the wall 112a of the slide bracket. As a result, the slide bracket 112 is free to slide along the slide beam 110b in the longitudinal direction thereof (in the thickness direction of the transom 16).

The clamp member 114 comprises a shaft member 114a connected to the link 118 and a transom abutment member 114b that abuts on the front face 16b of the transom 16. An elastic member 114c is attached to the transom abutment member 114b.

The shaft member 114a of the clamp member 114 passes through the hole 112d formed in the wall 112a of the slide bracket. As a result, the clamp member 114 is supported by the slide bracket 112 so as to be free to slide in the thickness direction of the transom 16. The transom abutment member 114b and the elastic member 114c attached thereto are located between the wall 112a of the slide bracket and the transom 16 so as to face the front face 16b of the transom 16.

As seen in the side view of FIG. 11, the manual lever 116 is V-shaped and the angular portion (apex) thereof is supported by the rotation axis 120 provided on the link accommodating member 112b of the slide bracket. The part of the manual lever 116 extending forward of the rotation axis 120 constitutes a grip to be grasped by the operator.

The manual lever 116, link 118 and clamp member 114 form a three-member slider crank mechanism composed of three revolving pairs (of members) with parallel axes and one sliding pair (of members) perpendicular thereto. In other words, the link 118 converts circular motion produced by rotating the manual lever 116 around the rotation axis 120 into linear motion of the clamp member 114. Conversely, the link 118 converts linear motion of the clamp member 114 into circular motion of the manual lever 116.

The operation or use of the mounting device 12 will now be explained in light of the foregoing.

First, the manual lever 116 is lowered (rotated downward) by the operator as shown in FIG. 11 to separate the clamp member 114 from the transom 16 (i.e., the straight line distance between the rotation axis 120 and the connecting axis 124 is shortened by enlarging the angle between the line connecting the rotation axis 120 and connecting axis 122 and the line connecting the connecting axis 122 and the connecting axis 124) and, simultaneously, the slide bracket 112 is slid toward the transom 16.

When the desired distance has been established between the slide bracket 112 and transom 16, then, as shown in FIG.

13, the manual lever 116 is raised to slide the clamp member 114 toward the transom 16 (i.e., the straight line distance between the rotation axis 120 and the connecting axis 124 is lengthened by reducing the angle between the line connecting the rotation axis 120 and connecting axis 122 and the line connecting the connecting axis 122 and the connecting axis 124). As a result, the elastic member 114c attached to the transom abutment member 114b is pressed onto the front face 16b of the transom 16.

The reaction force from the transom 16 that acts on the clamp member 114 at this time tilts the slide bracket 112 to increase the friction between the slide beam 110b and the inner wall of the hole 112c. The increased frictional force fixes the position of the slide bracket 112 relative to the slide beam 110b.

Figure 13:
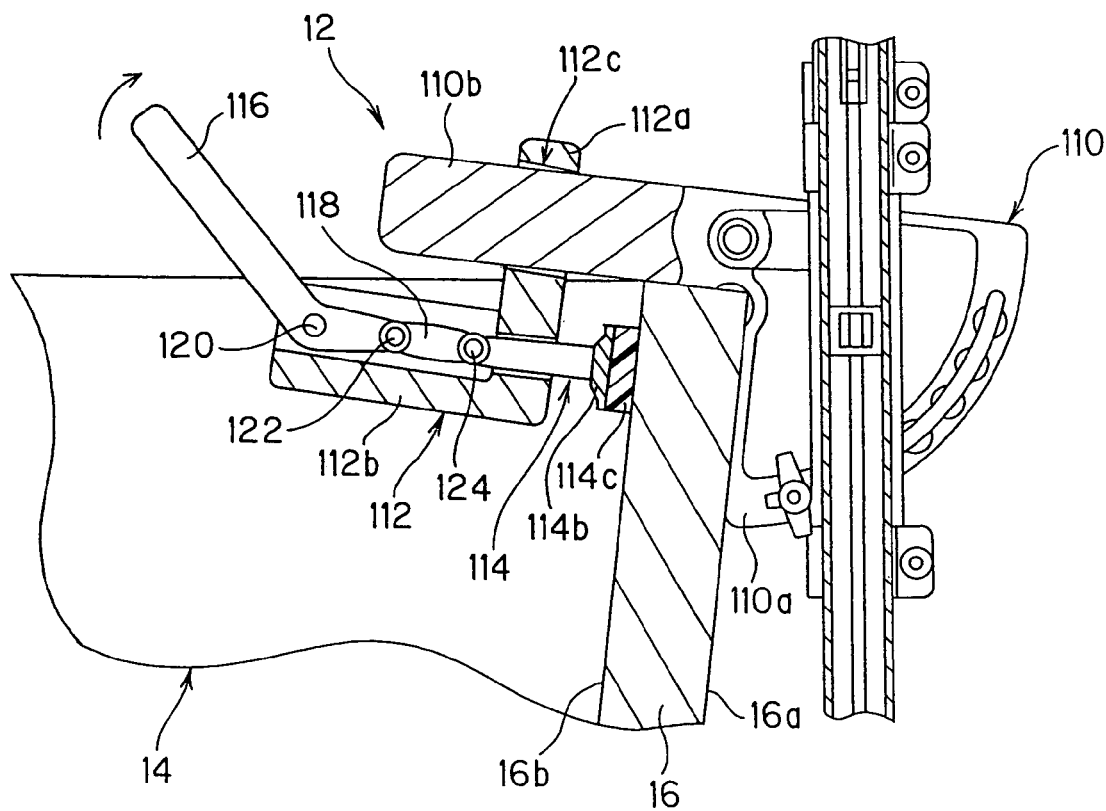
FIG. 13 is an enlarged sectional view of of the mounting device similar to FIG. 11.

Moreover, since the elastic member 114c is present at the distal end of the transom abutment member 114b, the elastic member 114c can be compressed to allow the manual lever 116 to be raised (rotated upward) to a position (angle) beyond the dead point of the slider crank mechanism shown in FIG. 13 (i.e., the point where the rotation axis 120 and connecting axes 122 and 124 all lie on the same straight line; in other words the point where the straight line distance between the rotation axis 120 and connecting axis 124 is longest).

Figure 14:
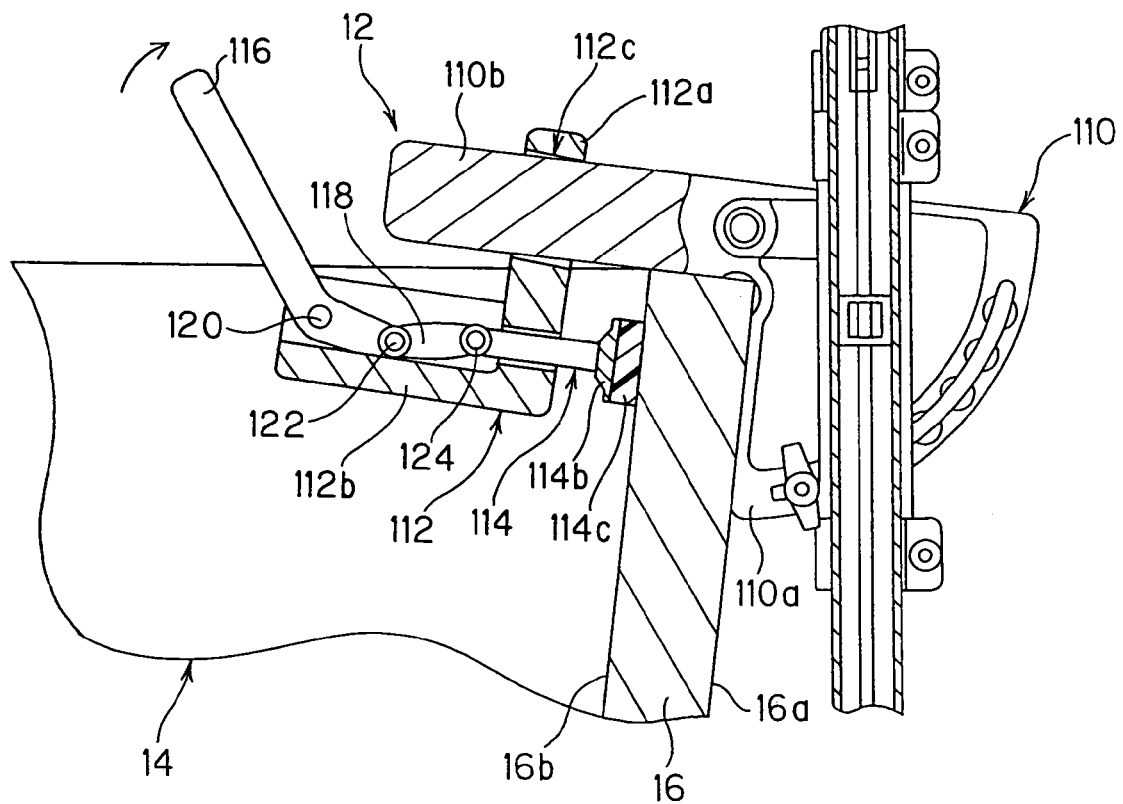
FIG. 14 is an enlarged sectional view of of the mounting device similar to FIG. 11.

As shown in FIG. 14, after the manual lever 116 has been raised to a position beyond the dead point of the slider crank mechanism, the connection region between the manual lever 116 and the link 118 abuts on the floor of the link accommodating member 112b to stop the displacement of the manual lever 116. Thus the link accommodating member 112b of the slide bracket 112 also functions as a stop for stopping displacement of the manual lever 116 at a position beyond the dead point of the slider crank mechanism.

The amount of elastic deformation of the elastic member 114c is made larger than the displacement (sliding distance) of the clamp member 114 between when the slider crank mechanism reaches the dead point and when displacement of the manual lever 116 stops. Therefore, insofar as the distance between the slide bracket 112 and the transom 16 is appropriate, the elastic member 114c remains compressed after displacement of the manual lever 116 stops.

So long as the elastic member 114c stays compressed, the clamp member 114 constantly receives a reaction force from the transom 16. After the manual lever 116 goes beyond the dead point, the reaction force from the transom 16 is converted to a rotational force in the direction of displacing the manual lever 116 upward, so that the manual lever 116 is maintained at the position where it abuts on the link accommodating member 112b. Raising the manual lever 116 to its displacement limit therefore ensures that the transom 16 will stay clamped between the transom abutment member 110a and the clamp member 114, i.e., that the outboard motor 10 stays firmly mounted on the transom 16.

As explained in the foregoing, the embodiment is configured to have the outboard motor 10 mounted on the stern of the boat 14 and having the propeller 44 to propel the boat 14, comprising: the internal combustion engine 20 having the engine output shaft (crankshaft) 22 and powering the propeller 44 through the engine output shaft; the electric motor 28 having the motor output shaft (rotor) 32 and powering the propeller 44 through the motor output shaft; the clutch 36 disposed between the engine 20 and the motor 28 and transmitting the output of the engine to the propeller through the engine output shaft and the motor output shaft, when the engine 20 is operated; and the motor output transmission mechanism 38 transmitting the output of the motor 28 to the engine 20 through the motor output shaft and the engine output shaft, when the engine 20 is to be started.

In the outboard motor 10, the motor output shaft (rotor) 32 is connected to the propeller 44 through the drive shaft 40, and the clutch is the centrifugal clutch 36 comprising: the clutch outer 54 slidably attached to the motor output shaft; and the clutch shoe 56 fastened to the engine output shaft (crankshaft) 22 so as to be pressed onto the clutch outer when the engine output shaft rotates. And the motor output transmission mechanism 38 comprising: the drive plate 60 fastened to the engine output shaft; the lever 66 being movably in contact with the clutch outer 54 so as to slide the clutch outer toward the drive plate such that the clutch outer engages with the drive plate, when moved; and the electromagnetic solenoid 70 connected to the lever to move the lever, when energized, such that the output of the motor 28 is transmitted to the engine 20 through the motor output shaft and the engine output shaft, when the engine 20 is to be started, and the clutch 36 has the center of rotation that lies on the same axis as the centers of rotation of the motor output shaft (rotor) 32, the engine output shaft (crankshaft) 22, the drive shaft 40 and the propeller 44.

Specifically, the outboard motor 10 according to the embodiment of the invention is equipped with the centrifugal clutch 36 located between the crankshaft 22 of the engine 20 and the rotor 32 of the electric motor 28 for, when the engine 20 operates, transmitting its output to through the rotor 32 to the propeller 44, and with the motor output transmission mechanism 38 for, when the engine 20 does not operate, transmitting the output of the electric motor 28 to the crankshaft 22. The engine 20 can therefore be started by the electric motor 28 used to drive the propeller 44. As a result, there is no need to install a separate electric motor for engine starting, so that starting of the engine 20 by electric power can be made possible with minimum increase in the size and cost of the outboard motor 10.

The motor output transmission mechanism 38 comprises the drive plate 60 fastened to the crankshaft 22, the lever 66 for sliding the clutch outer 54 of the centrifugal clutch 36 toward the drive plate 60 to engage the drive shaft 40 with the drive plate 60, and the solenoid 70 for driving the lever 66. Starting of the engine 20 is therefore enabled by a simple structure that effectively minimizes the size and cost of the outboard motor 10.

The embodiment is also configured to have the outboard motor 10 mounted on the stern of the boat 14 and having the propeller 44 to propel the boat 14, comprising: the internal combustion engine 20 having the engine output shaft (crankshaft) 22 and powering the propeller through the engine output shaft; the electric motor 28 having the motor output shaft (rotor) 32 and powering the propeller through the motor output shaft; the clutch 36 disposed between the engine 20 and the motor 28 and transmitting the output of the engine to the propeller through the engine output shaft and the motor output shaft, when the engine is operated; and the air blower provided between the motor 28 and the clutch 36 and blowing air to cool at least the motor 28, wherein the air blower comprises: the fan 72 connected to the motor output shaft (rotor) 32 and having a plurality of fins 82 formed to extend radially from the center of the motor output shaft (rotor) 32 so as to blow air regardless of the direction of rotation of the output motor shaft.

In the outboard motor 10, the engine 20 is located above the clutch 36 that is located above the motor in the vertical direction when mounted on the stern of the boat 14, and the air blower includes the inlet 74 opened at a location below the motor 28 and the outlet 76 opened at a location above the motor 28, such that the fan sucks in air from the inlet and blows upward to cool the motor 28, the clutch 36 and the engine 20 in succession. The inlet 74 is communicated with the air passage having the winding configuration, such that the air sucked in from the inlet 74 passes through the air passage to reach the motor 28. And, the air sucked in from the inlet 74 passes through the air passage, flows upward to cool the motor 28, the clutch 36 and the engine 20 and exits to exterior through the outlet 76.

Thus, the air blower is provided at a region of the rotor 32 between the centrifugal clutch 36 and electric motor 28 to blow air by rotating together with the rotor 32. The engine 20, the electric motor 28 and the centrifugal clutch 36 located therebetween can therefore be efficiently cooled.

The air blower is constituted as the centrifugal fan 72 capable of blowing air from below to above in the vertical direction regardless of the direction of rotation of the rotor 32 constituting the rotating shaft. In other words, the air blower can cool the electric motor 28, centrifugal clutch 36 and engine 20 in succession regardless of the direction of rotation of the rotor 32. This enables the electric motor 28 and centrifugal clutch 36 to be cooled before the temperature of the cooling air is raised by the engine 20, which produces a large amount of heat. The electric motor 28 and centrifugal clutch 36 can therefore be cooled efficiently.

The inlet 74 of the centrifugal fan 72 is situated below the electric motor 28 in the vertical direction. Fresh air sucked in through the inlet 74 is therefore efficiently supplied to the electric motor 28, so that the cooling effect on the electric motor 28 can be further improved. The air passage 80 communicating with the inlet 74 is given a winding configuration that prevents water from reaching the electric motor 28 and also helps to keep operating noise of the electric motor 28 from leaking to the outside.

The embodiment is further configured to have the outboard motor 10 mounted on the stern of the boat 14 and having the propeller 44 to propel the boat 14, comprising: the internal combustion engine 20 having the engine output shaft (crankshaft) 22 and powering the propeller through the engine output shaft; the electric motor 28 having the motor output shaft (rotor) 32 and powering the propeller through the motor output shaft, when the engine is not operated; the bar handle 50 installed to be operable by the operator; the throttle grip 90 provided at the bar handle to be rotatable by the operator and having the throttle opening regulator 100 that regulates the opening of the throttle valve of the engine 20 in response to the rotation of the throttle grip; the rotation angle sensor 92 installed in the throttle grip and outputting a signal indicative of the rotation angle of the throttle grip; and the controller 96 installed inside the throttle grip and inputting the outputted signal of the rotation angle sensor to control operation of the motor 28 in response to the outputted signal of the sensor. The outboard motor 10 further includes: the manual switch 94 provided at the bar handle 50 to be operable for the operator to input one from among instructions to start or stop the engine 20, to start or stop the motor 28 and to indicate the direction in which the boat 14 moves, and the throttle opening regulator comprises the pulley 100 being turnable in response to the rotation of the throttle grip 90, and the cable 102 wound around the pulley at one end and connected to the throttle valve at the other end.

Thus, the throttle grip 90 provided on the bar handle 50 is configured to comprise the controller 96 for controlling operation of the electric motor 28 in response to the rotation of the throttle grip 90 and with the pulley 100 for regulating the throttle opening by advancing and retracting the throttle cable 102 connected to the throttle valve of the engine 20. The speed of the engine 20 and the speed of the electric motor 28 can therefore be regulated by a single operating member.

The manual switch 94 is provided near the throttle grip 90 of the bar handle 50 for controlling the starting and stopping of the engine 20 and electric motor 28 and also the direction of rotation of the electric motor 28. This configuration improves operating efficiency by enabling easy selection of the parameter to be controlled (speed of the engine 20, or either the forward speed or reverse speed of the electric motor 28).

The embodiment is further configured to have the outboard motor 10 mounted on the stern of the boat 14, comprising: the drive shaft 40 oriented in a direction parallel with the vertical axis when mounted on the stern of the boat 14; the motor (engine 20, electric motor 28) connected to the upper end of the drive shaft 40 and rotating the drive shaft about the vertical axis; the propeller 44 connected to the lower end of the drive shaft to be rotatable about the vertical axis; and the cover 46 having a tube-like shape and enclosing the propeller 44 inside the tube, wherein the tube-like shape is the S-like shape and is formed with the openings 46a1, 46b1 directed forward and rearward relative to a direction of travel of the boat 14. The cover 46 is formed as an assembly of a plurality of removably attached members 46L, 46R.

Thus, the propeller 44 is attached to the lower end of the drive shaft 40 to be rotated about the vertical axis together with the drive shaft 40 and the propeller 44 is enclosed within the propeller cover 46 of S-like shape viewed from the side. This configuration enables the power transmission system between the engine 20 and the propeller 44 to be made gearless, thereby enhancing quietness (eliminating generation of gear noise).

The propeller cover 46 is formed with the openings 46a1 and 46b1 directed rearward and forward relative to the direction of forward travel of the boat 14. Therefore, by changing the direction of rotation of the propeller 44, it is possible to produce water stream for generating thrust to propel the boat 14 either forward or rearward.

The propeller cover 46 is formed as an assembly of removably attached left and right members 46L and 46R, thereby enabling easy maintenance and replacement of the propeller 44.

The embodiment is further configured such that, in the outboard motor 10 mounted on the transom 16 of the boat 14 by the mounting device 12. The mounting device 12 comprises: the stern bracket 110 having the transom abutment member 110a for abutment on the rear face of the transom 16 and the slide beam 110b projecting forward of the transom; the slide bracket 112 attached to the slide beam to be slidable in the thickness direction of the transom 16; the clamp member 14 supported by the slide bracket to be slidable in the thickness direction of the transom 16; the manual lever 116 supported to be swingable about the rotation axis formed on the slide bracket by the operator; and the link 118 interconnecting the clamp member 114 and the manual lever 116 to transmit displacement of the manual lever to the clamp member; such that the outboard motor 10 is mounted on the stern of the transom 16 by clamped between the transom abutment member 110a of the stern bracket 110 and the clamp member 114 by allowing the operator to operate the manual lever 116 to slide the clamp member 114 to the position where the clamp member abuts on the front face of the transom 16.

It further includes: the stop (link accommodating member 112b) stopping the manual lever at a position beyond the dead point of the slider crank mechanism constituted by the manual lever 116, the link 118 and the clamp member 114, and the elastic member 114c provided at the transom abutment member of the clamp member 114 that abuts on the front face of the transom 16 and having the amount of elastic deformation larger than the displacement of the clamp member 114 from the dead point to the position at which the displacement of the manual lever 116 is completed.

Thus, the mounting device 12 for mounting the outboard motor 10 on the transom 16 of the boat 14 comprises the stern bracket 110 equipped with the transom abutment member 110a for abutment on the rear face 16a of the transom 16 and the slide beam 110b projecting forward of the transom 16, the slide bracket 112 attached to the slide beam 110b to be slidable in the thickness direction of the transom 16, the clamp member 114 supported by the slide bracket 112 to be slidable in the thickness direction of the transom 16, the manual lever 116 supported to be swingable about the rotation axis 120 provided on the slide bracket 112, and the link 118 interconnecting the clamp member 114 and manual lever 116 for transmitting displacement of the manual lever 116 to the clamp member 114. This configuration enables clamping of the transom 16 between the transom abutment member 110a of the stern bracket 110 and the clamp member 114 to be achieved by operating the manual lever 116 to slide the clamp member 114 to the position where it abuts on the front face 16b of the transom 16. The outboard motor 10 can therefore be easily mounted on the boat 14.

The stop (constituted by the link accommodating member 112b) is provided for stopping the manual lever 116 at a position beyond the dead point of slider crank mechanism comprising the link 118 and clamp member 114, and the transom abutment member 114b of the clamp member 114 that abuts on the front face 16b of the transom 16 is fitted with the elastic member 114c having an amount of elastic deformation larger than the displacement (sliding distance) of the clamp member 114 between when the slider crank mechanism reaches the dead point and when displacement of the manual lever 116 stops. This configuration enables the outboard motor 10 to be mounted on the boat 14 solely by adjusting the position of the slide bracket 112 and operating the manual lever 116, thus making the outboard motor 10 still easier to mount on the boat 14.

It should be noted that, the mounting device 12 can be used not only in the hybrid outboard motor having the engine and electric motor, but also in outboard motor having only one type of motor, such as the engine or the electric motor.

It should also be noted that, although the embodiment explained in the foregoing uses a DC brushless motor as the electric motor 28, a different type of motor can be used instead. When a brushless motor is used, for example, the configuration of the controller 96 can be simplified by mechanically interlocking the operation of the switch contacts of the brushless motor with the operation of the solenoid 70 so as to operate the electric motor after the protuberance 54a of the clutch outer and protuberance 60a of the drive plate have engaged.

It should further be noted that, although in the foregoing the engine 20 has been said to have a displacement of about 50 cc and the electric motor 28 to have an output of several hundred Watts, these values are non-limitative examples.

It should further be noted that, although it has been described that the centrifugal fan 72 is provided at a region of the rotor 32 between the centrifugal clutch 36 and electric motor 28, it can instead be installed below the electric motor 28.

The disclosures of Japanese Patent Application Nos. 2004-220735, 2004-220736, 2004-220737, 2004-220738 and 2004-220739 all filed on Jul. 28, 2004, are incorporated herein in their entirety.

While the invention has thus been shown and described with reference to specific embodiments, it should be noted that the invention is in no way limited to the details of the described arrangements; changes and modifications may be made without departing from the scope of the appended claims.

What is claimed is:

1. An outboard motor adapted to be mounted on a stern of a boat and having a propeller to propel the boat, comprising:
    an internal combustion engine having an engine output shaft and powering the propeller through the engine output shaft;
    an electric motor having a motor output shaft and powering the propeller through the motor output shaft;
    a clutch disposed between the engine and the motor and transmitting an output of the engine to the propeller through the engine output shaft and the motor output shaft, when the engine is operated; and
    a motor output transmission mechanism transmitting an output of the motor to the engine through the motor output shaft and the engine output shaft, when the engine is to be started.

2. The outboard motor according to claim 1, wherein the motor output shaft is connected to the propeller through a drive shaft.

3. The outboard motor according to claim 2, wherein the clutch is a centrifugal clutch having a center of rotation that lies on a same axis as centers of rotation of the motor output shaft, the engine output shaft, the drive shaft and the propeller.

4. The outboard motor according to claim 1, wherein the clutch is a centrifugal clutch comprising:
    a clutch outer slidably attached to the motor output shaft; and
    a clutch shoe fastened to the engine output shaft so as to be pressed onto the clutch outer when the engine output shaft rotates.

5. The outboard motor according to claim 4, wherein the motor output transmission mechanism comprises:
    a drive plate fastened to the engine output shaft;
    a lever being movably in contact with the clutch outer so as to slide the clutch outer toward the drive plate such that the clutch outer engages with the drive plate, when moved; and
    an electromagnetic solenoid connected to the lever to move the lever, when energized, such
    that the output of the motor is transmitted to the engine through the motor output shaft and the engine output shaft, when the engine is to be started.

6. The outboard motor according to claim 1, further including:
    an air blower provided between the motor and the clutch and blowing air to cool at least the motor.

7. The outboard motor according to claim 6, wherein the air blower comprises:
    a fan connected to the motor output shaft and having a plurality of fins formed to extend radially from a center of the motor output shaft so as to blow air regardless of a direction of rotation of the output motor shaft.

8. The outboard motor according to claim 7, wherein the engine is located above the clutch that is located above the motor in a vertical direction when mounted on the stern of the boat, and the air blower includes an inlet opened at a location below the motor and an outlet opened at a location above the motor, such that the fan sucks in air from the inlet and blows upward to cool the motor, the clutch and the engine in succession.

9. The outboard motor according to claim 8, wherein the inlet is communicated with an air passage having a winding configuration, such that the air sucked in from the inlet passes through the air passage to reach the motor.

10. The outboard motor according to claim 9, wherein the air sucked in from the inlet passes through the air passage, flows upward to cool the motor, the clutch and the engine and exits to exterior through the outlet.

11. The outboard motor according to claim 1, further including:
a bar handle installed to be operable by an operator;
a throttle grip provided at the bar handle to be rotatable by the operator and having a throttle opening regulator that regulates an opening of a throttle valve of the engine in response to the rotation of the throttle grip;
a rotation angle sensor installed in the throttle grip and outputting a signal indicative of a rotation angle of the throttle grip; and
a controller installed inside the throttle grip and inputting the outputted signal of the rotation angle sensor to control operation of the motor in response to the outputted signal of the sensor.

12. The outboard motor according to claim 11, further including:
a manual switch provided at the bar handle to be operable for the operator to input one from among instructions to start or stop the engine, to start or stop the motor and to indicate a direction in which the boat moves.

13. The outboard motor according to claim 11, wherein the throttle opening regulator comprises a pulley being turnable in response to the rotation of the throttle grip, and a cable wound around the pulley at one end and connected to the throttle valve at other end.

14. The outboard motor according to claim 2, wherein the drive shaft is oriented in a direction parallel with a vertical axis when mounted on the stem of the boat and the propeller is connected to a lower end of the drive shaft to be rotatable about the vertical axis.

15. The outboard motor according to claim 14, further including: a cover having a tube-like shape and enclosing the propeller therein.

16. The outboard motor according to claim 15, wherein the tube-like shape is an S-like shape and is formed with openings directed forward and rearward relative to a direction of travel of the boat.

17. The outboard motor according to claim 15, wherein the cover is formed as an assembly of a plurality of removably attached members.

18. The outboard motor according to claim 1, further including a mounting device that enables the motor to be mounted on a transom of the stem of the boat, the mounting device comprising:
a stem bracket having a transom abutment member for abutment on a rear face of the transom and a slide beam projecting forward of the transom;
a slide bracket attached to the slide beam to be slidable in a thickness direction of the transom;
a clamp member supported by the slide bracket to be slidable in the thickness direction of the transom;
a manual lever supported to be swingable about a rotation axis formed on the slide bracket by an operator; and
a link interconnecting the clamp member and the manual lever to transmit displacement of the manual lever to the clamp member;
whereby the transom is clamped between the transom abutment member of the stem bracket and the clamp member to be mounted thereon by allowing the operator to operate the manual lever to slide the clamp member to a position where the clamp member abuts on a front face of the transom.

19. The outboard motor according to claim 18, further including:
a stop stopping the manual lever at a position beyond a dead point of a slider crank mechanism constituted by the manual lever, the link and the clamp member.

20. The outboard motor according to claim 19, further including:
an elastic member provided at the transom abutment member of the clamp member that abuts on the front face of the transom and having an amount of elastic deformation larger than a displacement of the clamp member from the dead point to a position at which the displacement of the manual lever is completed.

21. An outboard motor adapted to be mounted on a stem of a boat and having a propeller to propel the boat, comprising:
an internal combustion engine having an engine output shaft and powering the propeller through the engine output shaft;
an electric motor having a motor output shaft and powering the propeller through the motor output shaft;
a clutch disposed between the engine and the motor and transmitting an output of the engine to the propeller through the engine output shaft and the motor output shaft, when the engine is operated; and
an air blower provided between the motor and the clutch and blowing air to cool at least the motor.

22. The outboard motor according to claim 21, wherein the air blower comprises:
a fan connected to the motor output shaft and having a plurality of fins formed to extend radially from a center of the motor output shaft so as to blow air regardless of a direction of rotation of the output motor shaft.

23. The outboard motor according to claim 22, wherein the engine is located above the clutch that is located above the motor in a vertical direction when mounted on the stem of the boat, and the air blower includes an inlet opened at a location below the motor and an outlet opened at a location above the motor, such that the fan sucks in air from the inlet and blows upward to cool the motor, the clutch and the engine in succession.

24. The outboard motor according to claim 23, wherein the inlet is communicated with an air passage having a winding configuration, such that the air sucked in from the inlet passes through the air passage to reach the motor.

25. The outboard motor according to claim 24, wherein the air sucked in from the inlet passes through the air passage, flows upward to cool the motor, the clutch and the engine and exits to exterior through the outlet.

26. An outboard motor adapted to be mounted on a stem of a boat and having a propeller to propel the boat, comprising:
an internal combustion engine having an engine output shaft and powering the propeller through the engine output shaft;

an electric motor having a motor output shaft and powering the propeller through the motor output shaft, when the engine is not operated;

a bar handle installed to be operable by an operator;

a throttle grip provided at the bar handle to be rotatable by the operator and having a throttle opening regulator that regulates an opening of a throttle valve of the engine in response to the rotation of the throttle grip;

a rotation angle sensor installed in the throttle grip and outputting a signal indicative of a rotation angle of the throttle grip; and a controller installed inside the throttle grip and inputting the outputted signal of the rotation angle sensor to control operation of the motor in response to the outputted signal of the sensor.

27. The outboard motor according to claim 26, further including:

a manual switch provided at the bar handle to be operable for the operator to input one from among instructions to start or stop the engine, to start or stop the motor and to indicate a direction in which the boat moves.

28. The outboard motor according to claim 26, wherein the throttle opening regulator comprises a pulley being tumable in response to the rotation of the throttle grip, and a cable wound around the pulley at one end and connected to the throttle valve at other end.

29. In an outboard motor adapted to be mounted on a transom of a boat by a mounting device, the mounting device comprising:

a stem bracket having a transom abutment member for abutment on a rear face of the transom and a slide beam projecting forward of the transom;

a slide bracket attached to the slide beam to be slidable in a thickness direction of the transom;

a clamp member supported by the slide bracket to be slidable in the thickness direction of the transom;

a manual lever supported to be swingable about a rotation axis formed on the slide bracket by an operator; and a link interconnecting the clamp member and the manual lever to transmit displacement of the manual lever to the clamp member;

whereby the transom is clamped between the transom abutment member of the stem bracket and the clamp member to be mounted thereon by allowing the operator to operate the manual lever to slide the clamp member to a position where the clamp member abuts on a front face of the transom.

30. The mounting device according to claim 29, further including:

a stop stopping the manual lever at a position beyond a dead point of a slider crank mechanism constituted by the manual lever, the link and the clamp member.

31. The mounting device according to claim 30, further including:

an elastic member provided at the transom abutment member of the clamp member that abuts on the front face of the transom and having an amount of elastic deformation larger than a displacement of the clamp member from the dead point to a position at which the displacement of the manual lever is completed.

* * * * *

UNITED STATES PATENT AND TRADEMARK OFFICE
CERTIFICATE OF CORRECTION

PATENT NO.        : 7,300,322 B2
APPLICATION NO.   : 11/188144
DATED             : November 27, 2007
INVENTOR(S)       : Kitani et al.

It is certified that error appears in the above-identified patent and that said Letters Patent is hereby corrected as shown below:

Col. 16, Line 65
Claim 7, line 4
    Change "fms" to -- fins --

Col. 17, Line 44
Claim 14, line 3
    Change "stem" to -- stern --

Col. 17, Lines 59, 61 & Col. 18, Line 7
Claim 18, lines 3, 5 and 18
    Change "stem" to -- stern --

Col. 18, Line 25
Claim 21, line 1
    Change "stem" to -- stern --

Col. 18, Line 48
Claim 23, line 3
    Change "stem" to -- stern --

Col. 18, Line 62
Claim 26, line 1
    Change "stem" to -- stern --

Col. 19, Line 24
Claim 28, line 3
    Change "tumable" to -- turnable --

UNITED STATES PATENT AND TRADEMARK OFFICE
CERTIFICATE OF CORRECTION

PATENT NO.       : 7,300,322 B2
APPLICATION NO.  : 11/188144
DATED            : November 27, 2007
INVENTOR(S)      : Kitani et al.

It is certified that error appears in the above-identified patent and that said Letters Patent is hereby corrected as shown below:

Col. 19, Line 30 & Col. 20, Line 12
<u>Claim 29, lines 4 and 17</u>
  Change "stem" to -- stern --

Signed and Sealed this

Twenty Second Day of April, 2008

JON W. DUDAS
*Director of the United States Patent and Trademark Office*